United States Patent Office 2,898,384
Patented Aug. 4, 1959

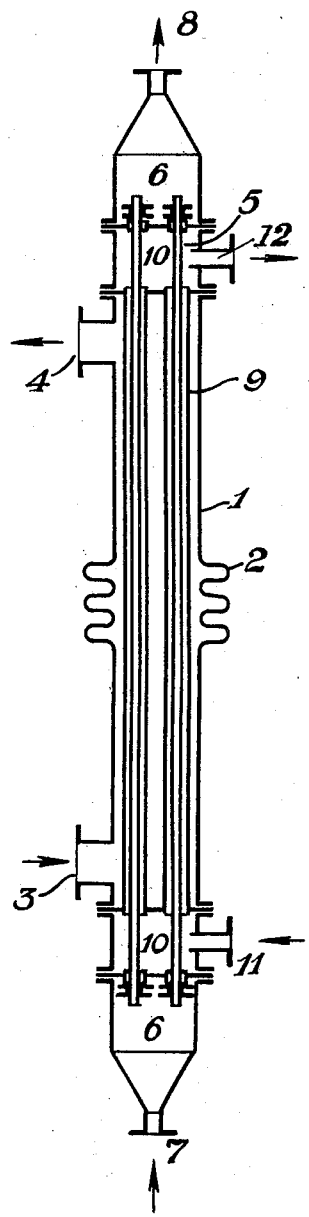

2,898,384
PROCESS FOR THE THERMAL CHLORINATION OF HYDROCARBONS

Jacques Viriot, Tavaux-Cites, France, assignor to Solvay & Cie, Brussels, Belgium, a Belgian company Application August 9, 1955, Serial No. 527,326

Claims priority, application Netherlands August 10, 1954

4 Claims. (Cl. 260—658)

The invention relates to a process and an apparatus for the thermal chlorination of hydrocarbons or partially chlorinated hydrocarbons.

The main object of the present invention is to provide a process and an apparatus enabling continuous chlorination of hydrocarbons to be effected at a controlled temperature.

It is known that the thermal chlorination of hydrocarbons or of their partially chlorinated derivatives must be carried out at a well defined temperature evenly maintained throughout the reaction chamber. It is also known that in the case of exothermic reactions, it is difficult to effect a temperature control by relying solely on the heat generated in the course of the reaction. It is often necessary to supply a relatively large amount of heat in order to start the reaction, and then to cool the reaction mixture to remove excess heat. As a result the temperature often varies considerably at different places of the chlorination vessel which involves a considerable reduction in the yield due to the slowing up of the chlorination at the cooler places and the production of small quantities of carbon and condensation products of a higher boiling point at the warmer places of the reaction chamber.

It is known, for the purpose of limiting these temperature peaks and their consequences, to effect the said reactions in the presence of considerable quantities of inert chemical compounds so as to increase the heat capacity of the reaction mass and thus limit the average increase in the resulting temperature. This has practical disadvantages. It requires larger reaction vessels, and the separation of the reaction products is complicated.

According to the present invention, temperature deviations are reduced by effecting the chlorination in a restricted space between two walls, one of which is heated to a temperature sufficient to start the reaction at its surface and the other of which is cooled and used for removing excess heat as it is generated.

The process is preferably performed in an apparatus comprising two concentric tubes surrounded by an external jacket, the internal tube being used for the circulation of a heating fluid, the annular space between the two tubes serving as the chlorination chamber, and the external jacket being used for the circulation of a cooling fluid.

It will be understood that due to the turbulence in the reaction medium, a more or less uniform heat exchange takes place through the apparatus from the hot wall to the cold wall which permits the mean temperature to be maintained within the limits required. In this way excess heat can be removed while maintaining a relatively small temperature difference between the extreme temperatures of the reaction medium. The arrangement obviates secondary reactions arising from contact with too hot walls as well as a decrease in the yield and any precipitation from contact with too cold walls.

The central or heating tube may sometimes be subjected to harsh working conditions as regards chemical corrosion as well as temperature resistance. Means may accordingly be provided to permit of ready interchange.

In practice, it will often be desirable to arrange parallel reaction chambers in one space. In this case, the apparatus may comprise groups of concentric tubes, the internal tubes which serve for the circulation of the heating fluid being connected on both sides to a header different from that which conjoins the reaction chambers constituted by the annular spaces between concentric tubes.

The apparatus may be used for the thermal chlorination of hydrocarbons, or partially chlorinated hydrocarbons, in the vapor phase or in the liquid phase.

A description will now be given, by way of example only, of a process for the thermal chlorination of methane and of methyl chloride to higher chloromethanes, particularly methylene chloride.

The accompanying drawing illustrates diagrammatically an apparatus for carrying out the process.

As shown in the drawings, the apparatus includes an external casing 1 comprising a resilient part 2 capable of withstanding expansion and contraction due to temperature and pressure variations, and connections 3 and 4 for the feed and discharge of the cooling fluid.

The casing encloses two groups of concentric tubes. The internal group 5 comprises removable tubes of stainless steel ending in collectors 6 provided with connections 7 and 8 for the feed and discharge of heating fluid. The external group 9 comprises tubes concentrically arranged with respect to those of the group 5. The annular spaces between the tubes of the two groups are connected to collectors 10, provided with connections 11 and 12 for the feed and the discharge of the reaction mixture.

In carrying out my process, the reactants are preheated to a temperature below 250° C., preferably 150–250° C., e.g. about 200° C., and the wall in contact with the heating fluid is heated to a temperature of 250 to 600° C., whereas the cooled wall is kept at a temperature below 150° C. To provide heat to the heated wall gases at a temperature of 400 to 600° C., e.g. 500 to 550° C., are introduced into contact with it and the cooled wall is maintained at its temperature by contact with the cooling fluid introduced at a temperature of about 50° C.

In producing methylene chloride according to the process of the invention, a mixture, pre-heated to about 200° C., consisting of chlorine, methane and methyl chloride, the molecular ratio of chlorine to hydrocarbons, $Cl_2:(CH_4+CH_3Cl)$, being not more than 0.5, is introduced into 11. Gases heated to 500–550° C. are introduced through the connection 7 to transfer their heat to the reaction gases by means of the hot wall of the internal tube and are discharged through the connection 8 of the header 6 at a temperature of about 350–380° C. Air heated to 50° C. is introduced through the connection 3, absorbs excess heat by means of the external wall of the chlorination chamber and is discharged through the connection 4 at a temperature of about 150° C.

The apparatus and method of operation adopted according to the present invention make it possible to effect a complete reaction of the chlorine and to prevent at the same time local overheating and the drawbacks resulting therefrom.

A higher chlorination ratio of $Cl_2:(CH_4+CH_3Cl)$, corresponding to the chlorinated hydrocarbons it is desired to produce, may be obtained by arranging several apparatus units in series and by introducing a portion of the total chlorine into each of the apparatus units.

Such arrangement also makes it possible, even with a low total chlorination ratio, to operate in each of the chlorination vessels arranged in series at a chlorination ratio of 0.20–0.30, which is very favorable to the good working of the process.

I claim:

1. Process of manufacturing chloromethanes solely by thermal chlorination of at least one compound selected from the group consisting of methane and partially chlorinated methane, which comprises the steps of preheating a mixture consisting essentially of chlorine and said compound to a temperature between 150 and 250° C., introducing said mixture into at least one annular reaction zone, introducing gases at a temperature of about 400–600° C. to heat the inner surface of said zone, and introducing a fluid at a temperature of about 50° C. to cool the outer side of said zone, said zone being free from filling material.

2. Process of manufacturing chloromethanes solely by thermal chlorination of at least one compound selected from the group consisting of methane and partially chlorinated methane, which comprises the steps of preheating a mixture consisting essentially of chlorine and said compound to a temperature of about 200° C., introducing said mixture into at least one annular reaction zone, introducing gases at a tempearture of about 500–550° C. to heat the inner surface of said zone, and introducing a fluid at a temperature of about 50° C. to cool the outer side of said zone, said zone being free from filling material.

3. Process according to claim 1, wherein the mixture of chlorine and of the compound is introduced into the reaction zone in proportions such that the molecular ratio $Cl_2:(CH_4+CH_3Cl)$ is comprised between 0.2 and 0.5.

4. Process according to claim 2, wherein the mixture of chlorine and of the compound is introduced into the reaction zone in proportions such that the molecular ratio $Cl_2:(CH_4+CH_3Cl)$ is comprised between 0.2 and 0.5.

References Cited in the file of this patent

UNITED STATES PATENTS

| 826,773 | Engleitner | July 24, 1906 |

FOREIGN PATENTS

| 378,873 | Great Britain | Aug. 17, 1932 |
| 378,979 | Great Britain | Aug. 25, 1932 |
| 513,947 | Great Britain | Oct. 26, 1939 |